United States Patent [19]
Yamazaki et al.

[11] Patent Number: 4,620,142
[45] Date of Patent: Oct. 28, 1986

[54] SEQUENCE SWITCHING SYSTEM IN TRACER CONTROL UNIT

[75] Inventors: Etuo Yamazaki; Hitoshi Matsuura, both of Hachioji, Japan

[73] Assignee: Fanuc Ltd, Minamitsura, Japan

[21] Appl. No.: 723,953

[22] PCT Filed: Aug. 7, 1984

[86] PCT No.: PCT/JP84/00396
§ 371 Date: Apr. 2, 1985
§ 102(e) Date: Apr. 2, 1984

[87] PCT Pub. No.: WO85/00772
PCT Pub. Date: Feb. 28, 1985

[30] Foreign Application Priority Data
Aug. 11, 1983 [JP] Japan ................................ 58-124939

[51] Int. Cl.$^4$ ............................................. G05B 19/36
[52] U.S. Cl. .................................... 318/578; 318/590; 364/474
[58] Field of Search ............... 318/565, 571, 578, 590; 364/474

[56] References Cited
U.S. PATENT DOCUMENTS

| 4,356,552 | 10/1982 | Imazeki et al. | 318/571 X |
| 4,424,570 | 1/1984 | Imazeki et al. | 318/578 X |
| 4,456,864 | 6/1984 | Imazeki et al. | 318/578 |
| 4,456,962 | 6/1984 | Imazeki et al. | 318/578 X |

Primary Examiner—B. Dobeck
Attorney, Agent, or Firm—Staas & Halsey

[57] ABSTRACT

The present invention is intended to make it possible to enlarge or reduce, as desired, a preset tracing range in a tracer control unit by actuation of a control switch (36) externally provided. To this end, according to the present invention, the tracer control unit is arranged so that it ignores a sequence changeover during actuation, that is, the ON state of the control switch (36) for inputting a sequence changeover signal and executes a sequence changeover which has been or is to be ignored when the operation of the control switch (36) is released, that is, turned OFF.

5 Claims, 8 Drawing Figures

FIG. 2

| ITEM | SYMBOL | CODE |
|---|---|---|
| MODE | (SEE FIG. 3) | A01 |
| REFERENCE DISPLACEMENT | $\varepsilon_0$ | A02 |
| APPROACH AXIS | X, Y, Z | A03 |
| APPROACH DIRECTION | +, − | A04 |
| APPROACH SPEED | $V_{AP}$ | F1 |
| TRACING DIRECTION | +, − | A05 |
| TRACING SPEED | $V_{TF}$ | F2 |
| PICK FEED DIRECTION | +, − | |
| PICK FEED SPEED | $V_{PF}$ | F3 |
| PICK FEED VALUE | P | A06 |
| TRACING STROKE LIMIT | $L_P$ | X1 |
| " | $L_N$ | X2 |
| TRACING END POSITION | $L_{TE}$ | Y1 |
| AUTOMATIC RETURN | ON, OFF | A07 |
| AUTOMATIC RETURN SPEED | $V_{AR}$ | F4 |
| AUTOMATIC RETURN POSITION | $L_{RP}$ | Z1 |

| | MODE | SUB-MODE |
|---|---|---|
| 1 | MANUAL TRACING | |
| 2 | FORWARD/REVERSE SCAN TRACING | 45 TRACING |
| 3 | ONE-WAY SCAN TRACING | |
| 4 | 360 CONTOUR TRACING | AXIAL DIRECTION PICK |
| | | Z-AXIS PICK |
| 5 | PARTIAL CONTOUR TRACING | |
| | | PENCIL TRACING |
| 6 | 3-DIMENSIONAL TRACING | |

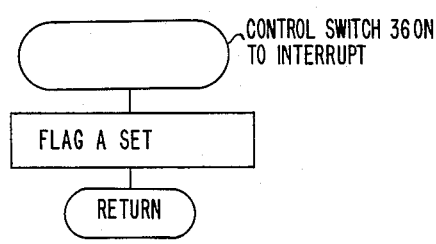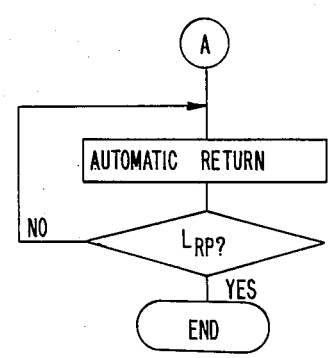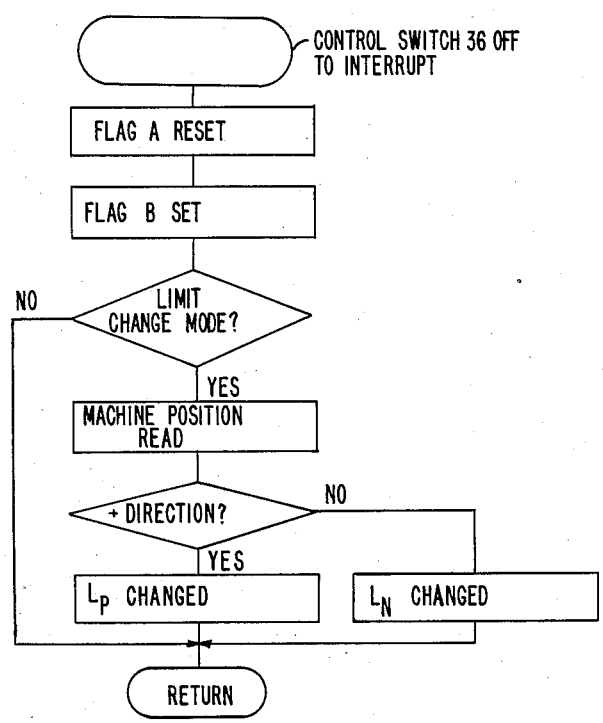

SEQUENCE SWITCHING SYSTEM IN TRACER CONTROL UNIT

BACKGROUND OF THE INVENTION

The present invention relates to a sequence switching system in a tracer control unit with which it is possible to manually change the timing for switching of a tracing sequence by means of a control switch externally provided.

Conventional tracer control units, in general, mechanically set a tracing path, for example, a tracing range in the X-Y plane by means of a limit switch, or by storing the machine position in a memory, and cut a workpiece within the set range while at the same time tracing a model with a stylus of the tracer head. It is difficult, however, to accurately predetermine the tracing range. To get over this problem, a sequence changeover system has heretofore been proposed which has a control switch externally provided for manually changing the switching of a tracing sequence, and which permits, by pressing the control switch, a sequence changeover, for instance, from a tracing operation to a pick feed operation even if the stylus lies within a preset tracing range. According to such a sequence, changeover system, a desired tracing range is first set and then modified in succession during the actual tracing operation.

With the conventional sequence changeover system, however, the sequence changeover is possible only within the preset tracing range but impossible outside it. This inevitably calls for a wide preset tracing range, incurring an increase in the time for tracing.

SUMMARY OF THE INVENTION

The present invention has for its object to enable a manual change of the timing for a sequence changeover by actuation of an externally provided control switch, whether within or without a preset tracing range.

The present invention is directed to a sequence switching system for a tracer control unit which operates according to a tracing direction and a tracing speed based on signals from a tracer head tracing the model surface and performs tracer control, and which is provided with a control switch for inputting a sequence switching signal, a sequence changeover ignore means for ignoring the current sequence changeover during the actuation of the control switch and a sequence changeover execute means for executing a sequence changeover which has been or is to be ignored when the operation of the control switch is released. Accordingly, when continuing the operation of the control switch, even if the stylus goes beyond a preset tracing range, that is, even if a limit switch defining the tracing range is stepped on or the machine position reaches the position stored in a memory that defines the tracing range, no sequence changeover takes place, and at the point of time when the operation of the control switch is released, a sequence changeover is carried out. Therefore, the sequence changeover can be achieved in a region outside the tracing range. Further, by once turning on the control switch within the tracing range and then turning off the switch at a desired position within the tracing range, the sequence changeover which is to be ignored is performed upon turning off of the switch, so that it is also possible to change the timing for a sequence changeover in the region within the tracing range.

BRIEF DESCRIPTION OF THE DRAWINGS

FIG. 2 is a diagram showing an example of tracing operation data;

DESCRIPTION OF PREFERRED EMBODIMENTS

Figure 1:
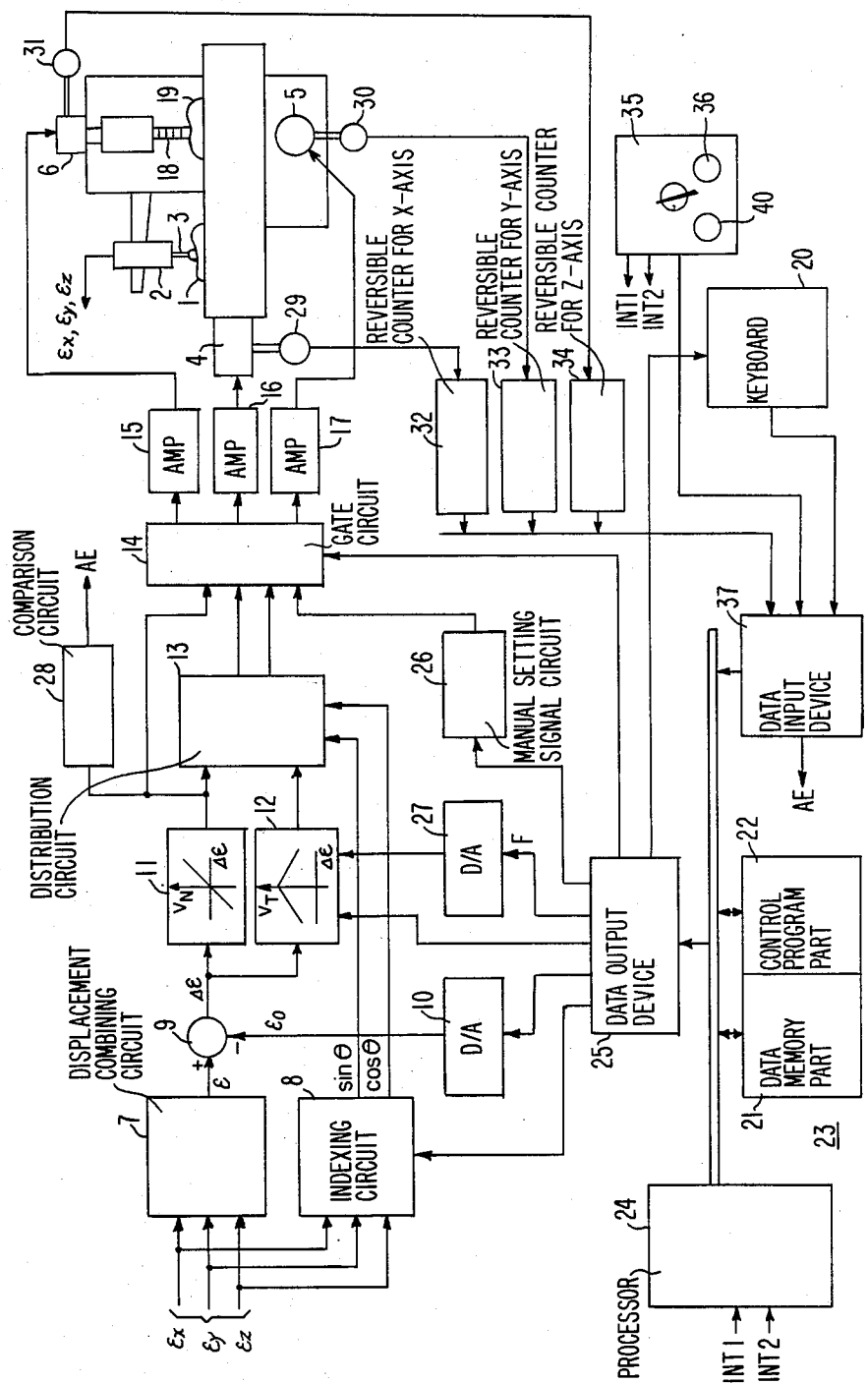
FIG. 1 is a block diagram illustrating the principal part of an example of a tracer control unit embodying the sequence switching system of the present invention.

In FIG. 1, a stylus 3 of a tracer head 2 makes contact with a model 1 and is fed by an X-axis servo motor 4, a Y-axis servo motor 5 and a Z-axis servo motor 6. Based on displacement signals $\epsilon_x$, $\epsilon_y$ and $\epsilon_z$ corresponding to displacement of the stylus 3, a displacement combining circuit 7 outputs a composite displacement signal $\epsilon$ $$\epsilon = \sqrt{\epsilon_x^2 + \epsilon_y^2 + \epsilon_z^2}$$

and an indexing circuit 8 outputs displacement direction signals $\sin \theta$ and $\cos \epsilon$. The composite displacement signal $\epsilon$ is provided to an adder 9, wherein a difference $\Delta\epsilon$ is obtained between it and a reference displacement signal $\epsilon_0$ from a D/A converter 10. Velocity operation circuits 11 and 12 produce a normal velocity signal VN and a tangential velocity signal VT, respectively, and based on the displacement direction signals $\sin \theta$ and $\cos \theta$, a distribution circuit 13 produces a velocity command signal, which is applied to a gate circuit 14. The velocity command signal is provided to one of amplifying output circuits 15 to 17 which is selected by the gate circuit 14, and a corresponding one of the servo motors 4 to 6 is driven corresponding to the velocity command signal, by which a cutter 18 and the tracer head 2 are fed as one body to cut a workpiece 19.

Data for defining a tracing operation is entered from a keyboard 20 or the like and stored in a memory 23 which comprises a data memory part 21 and a control program part 22. As the tracing operation proceeds, the data is read out of the memory 23 and a tracing path is controlled in accordance with the data. The input data may be such, for example, as shown in FIG. 2. Incidentally, such modes as shown in FIG. 3, for instance, can be adopted as tracing modes.

Figures 3, 4:
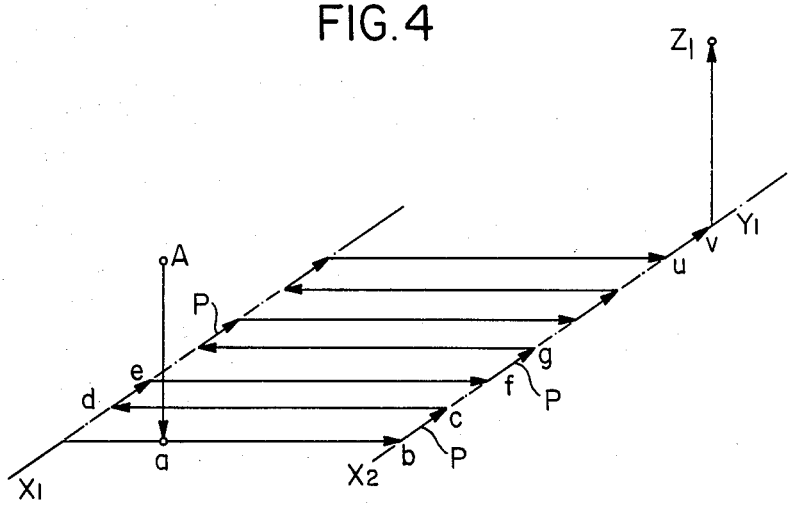
FIG. 3 is a diagram showing an example of a tracing mode.
FIG. 4 is an explanatory diagram of an example of a tracing path.
Figure 5:
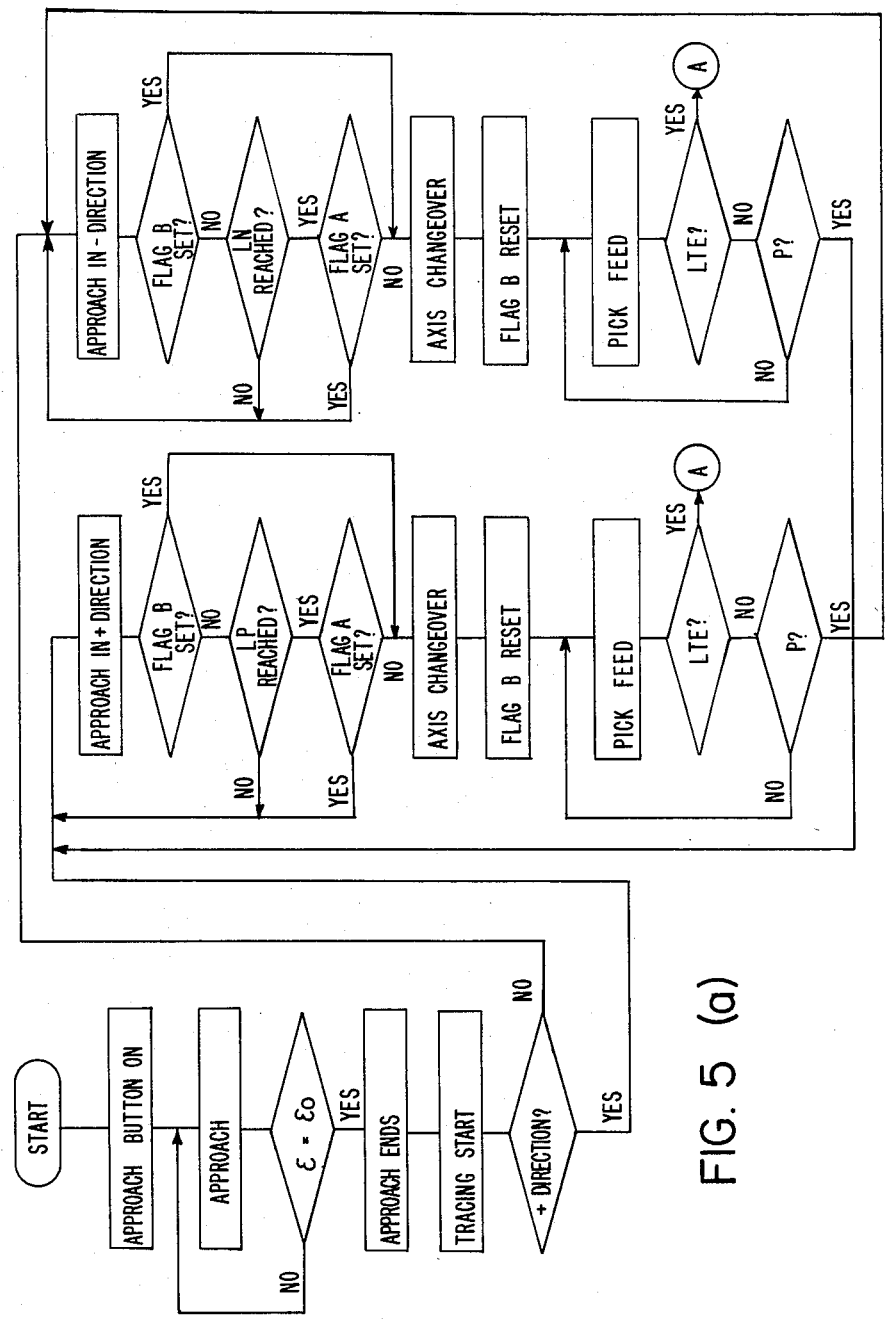
FIG. 5 is a flowchart explanatory of operation.

Assuming that approach from a starting point A is directed to a point a and that tracing stroke limits LP and LN are $X_1$ and $X_2$, a pick feed value is P, a tracing end position LTE is $Y_1$ and an automatic return position LRP is $Z_1$, as depicted in FIG. 4, and in the case where velocity, direction and other data are entered to perform tracing via a route a, b, c, . . . u, v and to return from the tracing end position $Y_1$ to the position $Z_1$ based on automatic return data, control is effected following the flowchart shown in FIG. 5(a).

Upon pressing an approach button not shown, a processor 24 reads out data on the approach axis, approach direction and approach speed from the memory 23 and provides a signal via a data output device 25 and a manual setting signal circuit 26 to the gate circuit 14 to activate the amplifying output circuit 15, bringing down the tracer head 2 and the cutter 18 by the Z-axis servo motor 6. The speed in this case can be determined by data F which is provided via the data output device 25 to a D/A converter 27.

Since the displacement signals $\epsilon_x$, $\epsilon_y$ are zero before the stylus 3 is brought into contact with the model 1, the difference signal $\Delta\epsilon$ is equal to the reference displacement signal $\epsilon_0$. When the composite displacement signal becomes equal to the reference displacement signal $\epsilon_0$ after the stylus 3 gets into contact with the model 18, a comparison circuit 23 detects that the difference signal $\Delta\epsilon$ is zero, and provides an approach end signal AE to a data input device 37. When the processor 24 reads the approach end signal AE and recognizes the completion of approach, tracing is started.

Upon starting of tracing, the processor 24 reads mode, reference displacement, tracing direction and the tracing velocity data, starting tracer control. The reference displacement data is converted by the D/A converter 10 into an analog reference displacement signal $\epsilon_0$, which is applied to the adder 9, and the X-axis servo motor 4 is driven in a direction based on the tracing direction data. By counting output pulses from position sensors 29 to 31 which are mounted on the servo motors 4 to 6, the current position of the machine (i.e. the current position of the stylus 3) is detected in reversible counters 32 to 34. The processor 24 compares the contents of the reversible counters with the tracing stroke limits LP and IN stored in the memory 23 and controls the tracing range. The control of the tracing range can be changed according to the manner of actuation of a sequence switching push button provided on a control panel 35, and this will hereinbelow be described for each case.

(1) When the sequence switching push button is not used (see FIGS. 5(a) and (d)):

For example, during tracing in a $-$(minus) direction, when the content of the X-axis reversible counter 32 reaches the tracing stroke limit IN, an axis changeover takes place and the processor 24 reads data on the pick feed direction, the pick feed value P and the pick feed speed and controls a pick feed. When the content of the Y-axis reversible counter 33 becomes equal to the tracing stroke limit LP, the processor 24 makes the stylus perform tracing in the opposite direction, that is, in a $+$(plus) direction. Further, the processor 24 reads a tracing end position LTB and decides whether or not the stylus has reached the end position during the pick feed, and when it is detected that the stylus has reached the end position, the processor reads automatic return, automatic return speed and automatic return position LRP data from the memory 23, and based on the fact that the automatic return is ON, it drives the Z-axis servo motor 6. When the content of the reversible counter 32 reaches the automatic return position LRP, the tracer control ends.

(2) When the sequence switching push button is used:

Upon pressing the sequence switching push button 36 of the control panel 35, an interrupt signal INT1 is sent to the processor 24. The processor 24 executes an interrupt process shown in FIG. 5(b), after which it sets a flag A set in the memory 23 or the like and returns to the former process. When the sequence switching push button 36 is released, an interrupt signal INT2 is sent to the processor 24. The processor 24 performs an interrupt process shown in FIG. 5(c) and in this process it resets the flag A and sets a flag B set in the memory 23 or the like.

Accordingly, when the push button 36 is pressed, for example, during tracing in the $-$direction, since the flag A is set, even if the content of the X-axis reversible counter 32 reaches the tracing stroke limit IN, no axis changeover takes place and tracing in the $-$direction is continued, as shown in FIG. 5(a). That is, tracing is continued beyond the predetermined tracing range. Then, when the push button 36 is released, since the flag B is set, an axis changeover is immediately carried out and the processor 24 makes the stylus perform tracing in the opposite direction, that is, in the $+$(plus) direction. Further, even if the push button 36 is pressed before tracing gets beyond the tracing range, an axis changeover immediately takes place similarly. Incidentally, the flag B is reset after the axis changeover.

In the interruption processing shown in FIG. 5(c), if a limit position changeover switch 40 provided on the control panel 35 is in the ON state to hold a limit change mode, then the machine position at the moment of release of the push button 36 is read and, in the case where the current tracing is in the $+$direction, the tracing stroke limit $X_2$ is rewritten with the X position of the read machine position, while in the case of $-$direction tracing, the tracing stroke limit position $X_1$ is rewritten with the read X position of the machine position. Consequently, the subsequent tracing range is defined by the corrected tracing stroke limit.

While the above embodiment is an application of the present invention to forward/reverse scan tracing, the invention is applicable, of course, to other kinds of tracing as well. Moreover, the present invention is also applicable to such a system that the tracing range is defined by a plurality of coordinate values, for example, the tracing stroke limit is $x_1$ within a range of $0 \leq y \leq \alpha$ and $x_2$ within a range $\alpha \leq y \leq \beta$. In such a case, the change of the tracing stroke limit in the processing of FIG. 5(c) is effected for each of the above ranges.

Furthermore, the present invention is applicable to a system in which the tracing range is defined by a limit switch. In this case, however, the change of the tracing stroke limit in FIG. 5(c) is impossible.

As described above, according to the present invention, it is possible to ignore and resume a tracing sequence changeover by actuation of an externally provided control switch whether within or without the tracing range preset as store data of a limit switch or memory. Accordingly, the present invention provides greater freedom in modifying the tracing range, offering the advantage of greater ease in initial setting of the tracing range. Further, since the present invention makes it possible to selectively ignore a sequence changeover and execute the ignored sequence changeover with the use of one control switch in such a manner as to ignore a sequence changeover from the beginning of actuation (turning ON) of the control switch and to resume a sequence changeover which has been or is to be ignored when the operation of the control switch is released (turned OFF), the number of parts used can be reduced as compared with that in such a system that uses one switch to ignore a sequence changeover and another switch to execute the ignored sequence changeover.

We claim:

1. A sequence switching system in a tracer control unit which operates to provide a tracing direction and a tracing speed based on signals from a tracer head tracing the surface of a model and performs tracer control, comprising a control switch for inputting a sequence switching signal, a sequence changeover ignore means for ignoring the current sequence changeover during actuation of the control switch, and a sequence changeover execute means for executing the sequence changeover which as been or is to be ignored when the operation of the control switch is released.

2. A tracer control system comprising
control means for operating a tracer for tracing a tracer head with respect to a model over a tracing range, including for providing changeover sequences between respective successive pairs of operations of said tracing over said range, and
a control switch which can be engaged and released, responsive to said control means, for modifying the position at which said changeover sequence between respective pairs of said operations occurs,
wherein said control means operates such that when said control switch is engaged prior to when said tracer head reaches a respective limit of said tracing range at which said changeover sequence is to occur, (1) if said control switch is released prior to said tracer head reaching said respective limit, the changeover sequence that otherwise would next occur at the respective limit instead occurs at the respective position of the tracer head at the time of release, and, (2) if said control switch is released after said tracer head reaches said respective limit, said tracer head continues beyond said limit without any changeover sequence occurring until said control switch is released.

3. The system of claim 2, wherein the respective position at which said control switch is released becomes the respective position limit for subsequent tracing of said model.

4. The system of claim 2, wherein the two respective operations between which said changeover sequence occurs are a tracing operation and a following pick feed operation.

5. The system of claim 3, wherein the two respective operations between which said changeover sequence occurs are a tracing operation and a following pick feed operation.

* * * * *

UNITED STATES PATENT AND TRADEMARK OFFICE
CERTIFICATE OF CORRECTION

PATENT NO. : 4,620,142
DATED : October 28, 1986
INVENTOR(S) : Etuo Yamazaki and Hitoshi Matsuura It is certified that error appears in the above-identified patent and that said Letters Patent is hereby corrected as shown below:

Column 2, line 30, "cos $\epsilon$" should be --cos $\theta$--.

Column 3, line 6, after "$\epsilon_y$" insert --and $\epsilon_z$--.

Column 5, line 7, "as" should be --has--.

Signed and Sealed this

Third Day of February, 1987

Attest:

DONALD J. QUIGG

Attesting Officer

Commissioner of Patents and Trademarks